United States Patent
Ahluwalia et al.

(10) Patent No.: US 9,800,324 B2
(45) Date of Patent: Oct. 24, 2017

(54) PRESERVING TERMINAL NETWORK ADDRESSES OVER SATELLITE NETWORKS WHEN SWITCHING TO A DIFFERENT SATELLITE HUB

(71) Applicants: Sandeep Ahluwalia, Gaithersburg, MD (US); Liqing Xiao, Clarksburg, MD (US); Ran Wang, Rockville, MD (US); Neha Jain, Clarksburg, MD (US)

(72) Inventors: Sandeep Ahluwalia, Gaithersburg, MD (US); Liqing Xiao, Clarksburg, MD (US); Ran Wang, Rockville, MD (US); Neha Jain, Clarksburg, MD (US)

(73) Assignee: Hughes Network Systems, L.L.C., Germantown, MD (US)

( * ) Notice: Subject to any disclaimer, the term of this patent is extended or adjusted under 35 U.S.C. 154(b) by 158 days.

(21) Appl. No.: 14/696,887

(22) Filed: Apr. 27, 2015

(65) Prior Publication Data
US 2016/0315692 A1    Oct. 27, 2016

(51) Int. Cl.
*H04B 7/185* (2006.01)
*H04L 29/12* (2006.01)

(52) U.S. Cl.
CPC ..... *H04B 7/18528* (2013.01); *H04B 7/18519* (2013.01); *H04B 7/18521* (2013.01); *H04B 7/18584* (2013.01); *H04L 61/2038* (2013.01)

(58) Field of Classification Search
CPC .... H04L 67/02; H04L 67/2847; H04L 69/239
See application file for complete search history.

(56) References Cited

U.S. PATENT DOCUMENTS 6,256,496 B1 * 7/2001 Dintelmann ....... H04B 7/18584
455/12.1
2005/0105524 A1    5/2005 Stevens et al.
(Continued)

FOREIGN PATENT DOCUMENTS

EP        1422889 A2    5/2004
WO    2008097367 A2    8/2008

OTHER PUBLICATIONS

Hogie K. et al., "Link and routing issues for Internet protocols in space", Aerospace conference, 2001, IEEE Proceedings, Mar. 10-17, 2001, vol. 2, pp. 963-976.
(Continued)

*Primary Examiner* — Chandrahas Patel
(74) *Attorney, Agent, or Firm* — Capitol City TechLaw; Jasbir Singh (57) ABSTRACT

An apparatus and a system to preserve Internet Protocol (IP) addressing over a space link is disclosed. The apparatus includes: a network interface; a space link interface; a configuration table comprising Very Small Aperture Terminal (VSAT) network information and a satellite hub table, wherein the VSAT network information comprises subnet and range information for a network linked to the network interface; and a VSAT registration module. The VSAT registration module is configured to: select a satellite hub from the satellite hub table for communicating with using the space link interface, register the apparatus with the selected hub, and advertise the local-network information by communicating a route based on the local-network information to the selected hub, wherein the local-network information is independent of the hub selected from the satellite hub table.

17 Claims, 7 Drawing Sheets

(56) References Cited

U.S. PATENT DOCUMENTS

| | | |
|---|---|---|
| 2008/0219266 A1 | 9/2008 | Agarwal et al. |
| 2012/0020280 A1 | 1/2012 | Jansson et al. |
| 2013/0109299 A1* | 5/2013 | Roos ................ H04B 7/18528 455/12.1 |
| 2015/0200909 A1 | 7/2015 | Markovitz et al. |

OTHER PUBLICATIONS

Search report for International Application No. PCT/US2016/029444.

Search report for International Application No. PCT/US2016/029443.

Shahriar et al, "Mobility management protocols for next-generation all-IP satellite networks [architectures and protocols for mobility management in all-IP mobile networks]", IEEE Wireless Communications, vol. 14, No. 2, 1 Apr. 2008, pp. 46-54.

* cited by examiner

PRESERVING TERMINAL NETWORK ADDRESSES OVER SATELLITE NETWORKS WHEN SWITCHING TO A DIFFERENT SATELLITE HUB

CROSS REFERENCE TO OTHER APPLICATIONS

The contents of co-filed U.S. patent application Ser. No. 14/696,830, filed Apr. 27, 2015, are incorporated herein in its entirety.

FIELD

The present disclosure relates to a method and a system for load sharing and reducing redundancy costs for redundant networks over a space link, and more particularly, for load sharing between a satellite hub and multiple Very Small Aperture Terminals (VSATs) by the VSATs advertising their routes to the satellite hub. Preserving the IP addresses minimizes the impact of a satellite hub change as a network reconfiguration is not required. The satellite hub may be changed for many reasons, for example, due to load balancing or satellite hub failure. As such, an enterprise can provide networking redundancy for networks connected over a space link at lower costs.

BACKGROUND

Enterprises satellite networks typically use a satellite hub interface with the satellite radio equipment at one end and a "Head Office Router" or enterprise router at the other end. A Very Small Aperture Terminal (VSAT) connects branch offices of the enterprise to the enterprise network. High availability for the enterprise network is provided by using redundant satellite hubs. Typically, in enterprise networks the Internet Protocol (IP) addresses assigned to VSATs are static and predefined. This poses a challenge in maintaining satellite hub redundancy. This challenge is addressed by having an active-standby configuration as described in FIG. 1.

Figure 1:
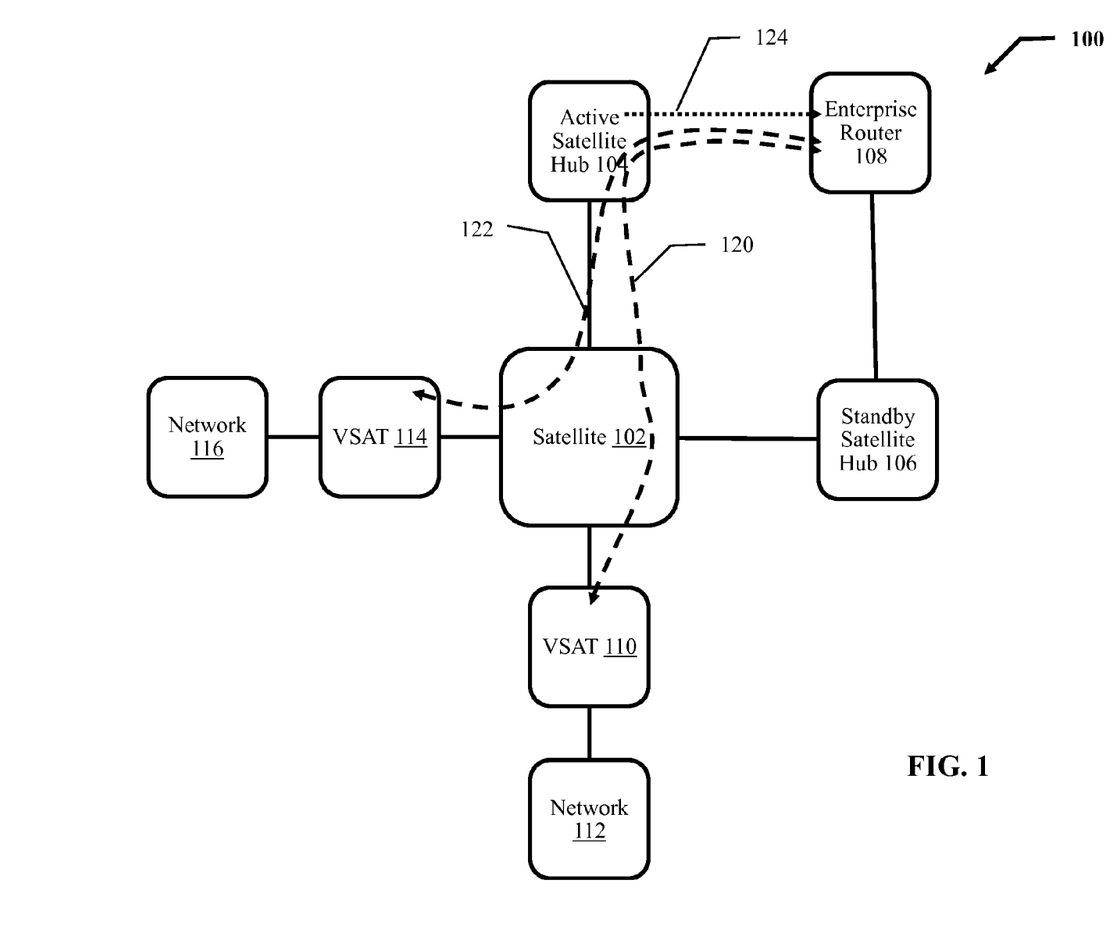
FIG. 1 illustrates a prior art enterprise satellite network.

FIG. 1 illustrates a prior art enterprise satellite network 100. The network 100 includes a satellite 102, an active satellite hub 104, a standby satellite hub 106, an enterprise router 108, a VSAT 110 and a VSAT 114. Devices (not shown) on a remote network 112 (for example, 10.10.2.0/24) use the VSAT 110 over a communication path 120 to communicate with devices (not shown) connected to the enterprise router 108 via the satellite 102 and the active satellite hub 104. Similarly, devices (not shown) on a remote network 116 use the VSAT 114 over a communication path 122 to communicate with devices (not shown) connected to the enterprise router 108 via the satellite 102 and the active satellite hub 104.

The provisioning of the active satellite hub 104 advertises a route 124 (for example, 10.10.0.0/16) from the enterprise router 108 and to a satellite based network via the active satellite hub 104. Route 124 directs the enterprise router 108 to communicate with all IP networks whose addresses begin with the octets 10.10 via the active satellite hub 104. The active satellite hub 104 manages routing of traffic between the enterprise router 108 and remote networks 112, 116 through the VSAT 110 and VSAT 114, as necessary. Analogously, the provisioning of the standby satellite hub 106 ensures that it does not advertise a route to the satellite network (for example, 10.10.0.0/16) via the standby satellite hub 106.

In network 100, the standby satellite hub 106 provides only a 1:1 redundancy. Also, the standby satellite hub 106 cannot be utilized for load sharing. Furthermore, the standby satellite hub 106 sits idle until the active satellite hub 104 goes offline. In addition, when a switchover takes place, the entire population of VSATs may be impacted by a switchover. A lack of scalability is also an issue with this approach. When traffic grows, the enterprise network cannot be expanded by adding another hub processor. Instead, a pair of redundant satellite hubs has to be added leading to additional costs. Lastly, a separate IP address pool has to be assigned to the new pair of satellite hubs, thus partitioning the VSATs connecting to the new satellite hubs into a set of VSATs, that is different than the set of VSATs connecting to the not-new satellite hubs. This partitioning further increases the management overhead.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

An apparatus to preserve Internet Protocol (IP) addressing over a space link is provided. The apparatus includes: a network interface; a space link interface; a configuration table comprising Very Small Aperture Terminal (VSAT) network information and a satellite hub table, wherein the VSAT network information comprises subnet and range information for a network linked to the network interface; and a VSAT registration module. The VSAT registration module is configured to: select a satellite hub from the satellite hub table for communicating with using the space link interface, register the apparatus with the selected hub, and advertise the local-network information by communicating a route based on the local-network information to the selected hub, wherein the local-network information is independent of the hub selected from the satellite hub table.

A system to preserve Internet Protocol (IP) addressing over a space link is provided. The system includes: a Very Small Aperture Terminal (VSAT) and a satellite hub. The VSAT including: a network interface, a space link interface, and a configuration table comprising Very Small Aperture Terminal (VSAT) network information and a satellite hub table, wherein the VSAT network information comprises subnet and range information for a network linked to the network interface, and a VSAT registration module configured to select a satellite hub from the satellite hub table for communicating with using the space link interface, register the apparatus with the selected hub, and advertise the local-network information by communicating a route based on the local-network information to the selected hub, wherein the local-network information is independent of the hub selected from the satellite hub table. The satellite hub comprising: a registration module configured to register the VSAT, and an advertise networks module to advertise the local network information from the VSAT.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

The terminology used herein is for describing particular embodiments only and is not intended to be limiting of the present disclosure. As used herein, the singular forms "a," "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first," "second," and the like does not imply any particular order, but they are included to either identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

Overview

Figure 2:
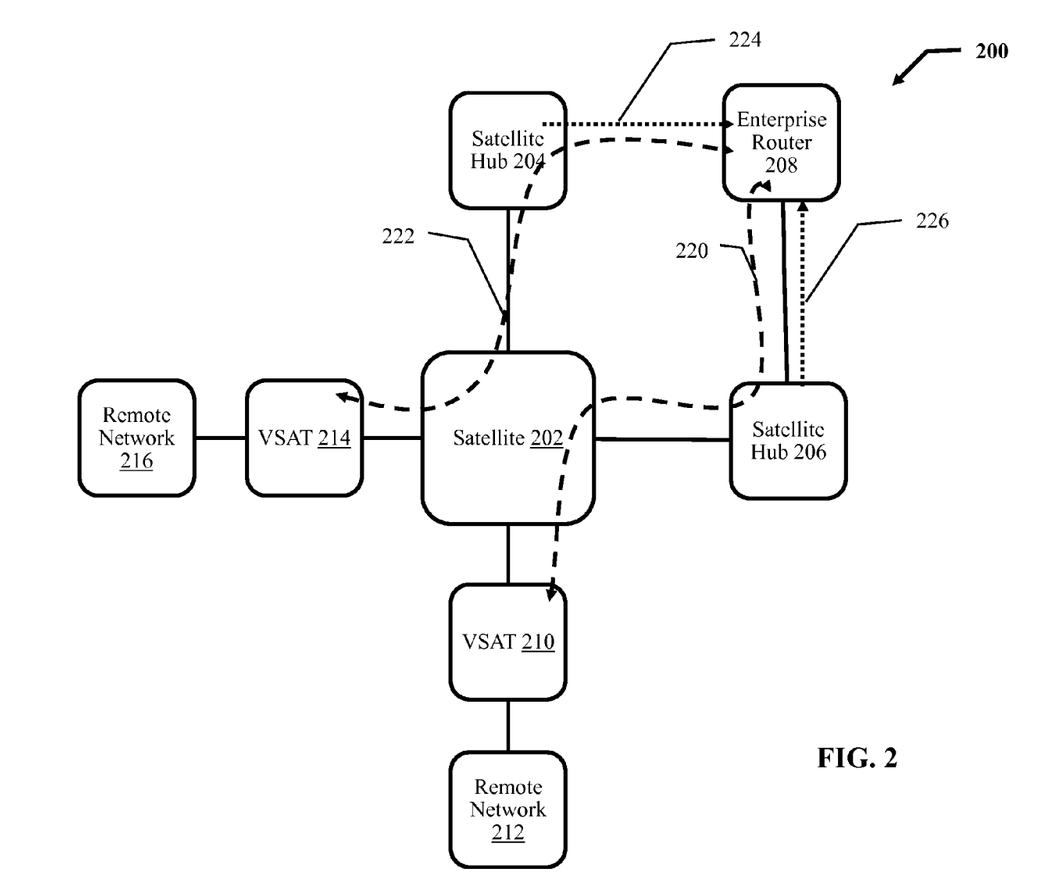
FIG. 2 illustrates an enterprise satellite network according to various embodiments.

Routing on a space link for satellite data communications can be used to reduce the cost of providing redundancy while preserving VSAT addresses across satellite hub changes. Satellite hubs can be load shared as VSATs advertise their routes via the selected satellite hub. This can enable use of 1 for N redundancy scheme, thus reducing hardware cost as illustrated in FIG. 2, for example.

In exemplary embodiments, a system, method, and apparatus for adding redundancy on a satellite network is disclosed. A VSAT can select a satellite hub and the VSAT can advertise its routes to the selected satellite hub. The selected satellite hub can advertise the VSAT's routes to the enterprise router. Unlike the prior art (see, FIG. 1), multiple satellite hubs may be connected to an enterprise router in an active load sharing mode. VSAT routes can be shared or advertised to the enterprise router with a standard routing protocol, such as, the Border Gateway Protocol (BGP), over the space link. With standard routing protocol on the space link, enterprises can use the standard routing protocol's rich feature set across the enterprise. In some embodiments, the details of inter-connections between the VSATs and multiple satellites, and any changes thereto, are updated automatically and hidden from the enterprise router by using a standard routing protocol stack.

Use of a standard routing protocol, such as, Border Gateway Protocol (BGP), provides several advantages. For example, BGP sends delta routing updates so it scales very well with increasing complexity of VSAT site network and increasing number of VSATs. Furthermore, full flexibility of the BGP routing is available over the space link including use of access lists and route maps to control the advertisement of routes, and use of BGP communities to group VSATs or networks. As such, routing rules can then be defined for the specified communities permitting a very fine grain control over routing in an enterprise. Moreover, the routing may be implemented with off-the-shelf standards compliant routing protocol stacks. This may improve product compatibility and interoperability as industry standard protocol stacks interoperate with routers from most manufacturers. Additionally, a standard routing software suite minimizes development costs and improves the reliability of the product as standard routing suites are well tested due to extensive use in the industry. Lastly, end user training costs are reduced as the network operators already know how to configure industry standard routing stacks.

The present disclosure provides an enterprise networking solution that enables large enterprise networks to connect via a satellite link. The enterprise network may be architected as a hub-and-spoke network including redundant connectivity between the VSATs and the enterprise router. In some embodiments, the enterprise network may utilize to connect a plurality of satellite hubs and the individual remote offices are connected via VSATs. The enterprise networking solution provides for connecting one or more satellite hubs to a VSAT while preserving network addresses at the remote offices.

A very small aperture terminal (VSAT) is a two-way satellite ground station or a stabilized maritime VSAT antenna with a dish antenna that is smaller than 3 meters. The parabolic shape of the dish has special reflective properties that enable it to concentrate and focus signals to a single point, i.e., the focal point. The dish receives and transmits signals, after reflecting and concentrating them, from and to satellites. VSATs may be used to transmit narrowband data (point of sale transactions, such as, credit card, polling or RFID data; or SCADA), or broadband data (for the provision of Satellite Internet access to remote locations, VoIP or video). VSATs may be also used for transportable, on-the-move (utilizing phased array antennas) or mobile maritime communications. Very Small Aperture Terminal (VSAT) remote terminals may be used to communicate data, voice and video, to or from a remote site or location a satellite hub. In exemplary embodiments, a VSAT can include a router/gateway functionality therein. The VSAT router/gateway functionality can route IP datagrams between a space link and a standard network interface, for example, an Ethernet interface, a Wi-Fi interface, and the like.

The satellite hub provides a hub terminal including an outdoor transceiver and antenna, indoor integrated modem and multiplexing systems, a single-cable inter-facility link, and a variety of network interfaces that may simultaneously deliver traffic to a network backbone, for example, in TDM, ATM, and IP formats. Sectors may be provisioned for 1:N (e.g., N=4) active redundancy. In exemplary embodiments, the satellite hub can include a router/gateway functionality therein. The satellite hub router/gateway functionality can route IP datagrams between a space link and a standard network interface, for example, a network backbone, an Ethernet interface, a Wi-Fi interface, and the like.

FIG. 2 illustrates an enterprise satellite network 200 according to various embodiments. The network 200 includes a satellite 202, a satellite hub 204, a satellite hub 206, an enterprise router 208, a VSAT 210, a VSAT 214, a remote network 212 and a remote network 216. Devices (not shown) on the remote network 212 (for example, devices assigned address in the subnet 10.10.2.0/24) use the VSAT 210, over a communication path 220, to communicate with devices (not shown) connected to the enterprise router 208 via the satellite 202 and the satellite hub 104. Similarly, devices (not shown) on a remote network 216 (for example, devices assigned address in the subnet 10.10.1.0/24) use the VSAT 214 over a communication path 222 to communicate with devices (not shown) connected to the enterprise router 208 via the satellite 202 and the satellite hub 206.

In exemplary embodiments, the VSAT 210 registers with the satellite hub 206 and communicates the availability of the remote network 212. The satellite hub 206 advertises the availability of the remote network 212 via the satellite hub 206 as route 224, for example, to the enterprise router 208. In exemplary embodiments, the VSAT 210 registers with the satellite hub 206 as desired, for example, at startup, communication error, availability of a space link or the like.

Similarly, in exemplary embodiments, the VSAT 214 registers with the satellite hub 204 and communicates the availability of the remote network 216. The satellite hub 204 advertises the availability of the remote network 216 via the satellite hub 204 as route 226, for example, to the enterprise router 208. In exemplary embodiments, the VSAT 214 registers with the satellite hub 204 as desired, for example, at startup, communication error, availability of a space link or the like.

In exemplary embodiments, the advertising of a route, for example, route 224 or route 226, can be done with standard Internet routing protocols. In exemplary embodiments, the advertising of a route by a satellite hub uses the Border Gateway Protocol (BGP) over an Internet Protocol (IP) network.

According to various embodiments, a satellite hub does not advertise a remote network when provisioning of the satellite hub happens; instead the satellite hub advertises a remote network upon a successful registration by a VSAT. As such, the active satellite hub 104 and the standby satellite hub 206 advertise the routes 224 and 226 after they are learnt from a respective registration of the VSAT 210 and the VSAT 214, for example, route 224 to communicate with remote network 216 via satellite hub 204 including addresses 10.10.1.0/24 and route 226 to communicate with remote network 212 via satellite hub 206 including addresses 10.10.2.0/24. Accordingly, the satellite hub 204 manages routing of traffic between the enterprise router 108 and remote network 216 and the satellite hub 206 manages routing of traffic between the enterprise router 108 through the VSAT 214 and remote network 212 through the VSAT 210, as necessary.

Figure 3:
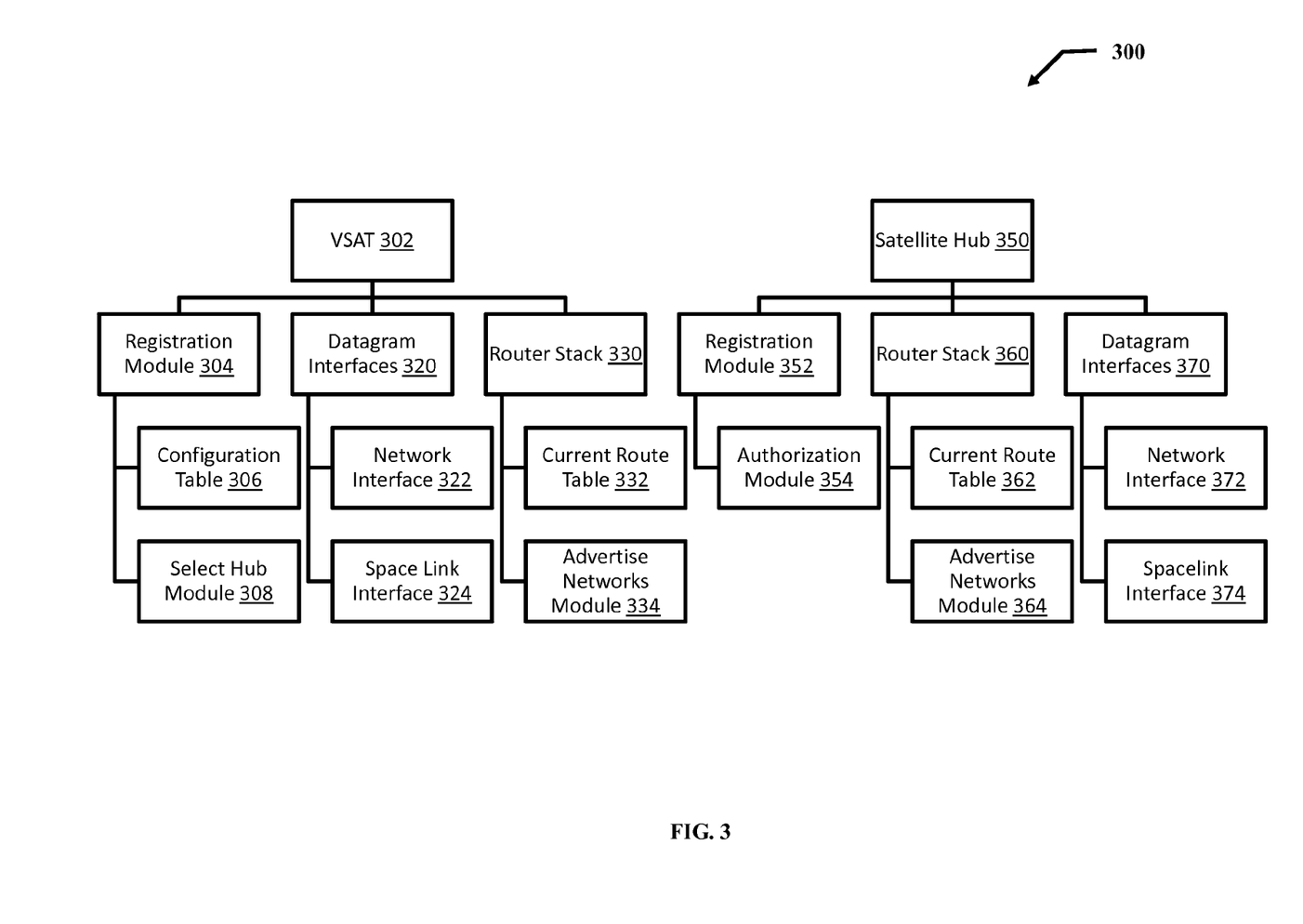
FIG. 3 illustrates a logical view of network adaptors and communications in a satellite communication apparatus according to various embodiments.

FIG. 3 illustrates a logical view of network adaptors and communications in a satellite communication apparatus according to various embodiments.

According to various embodiments, a satellite communication system 300 may provide redundant connectivity for network communications over a satellite link in an enterprise network. The satellite communication system 300 may include a VSAT 302 and a satellite hub 350.

The VSAT may be deployed at a remote office. The VSAT 302 may include the registration module 304, datagram interfaces 320 and a router stack 330. The registration module 304 may include a configuration table 306 and a select hub module 308. The datagram interfaces 320 may include a network interface 322 and a space link interface 324. The router stack 330 may include a current route table 332 and an advertise networks module 334.

The registration module 304 may be invoked by the VSAT 302 to manage all VSAT registration related activities using, for example, the configuration table 306 and the select hub module 308. The registration module 304 may advertise local network information using the advertise networks module 334 after successfully selecting and establishing communications with a satellite hub. In some embodiments, the VSAT 302 may initiate or setup communications with the selected satellite hub via the space link interface 324 with the registration module 304. In some embodiments, the registration module 304 may initiate or force advertisement of the route between the VSAT 302 and the satellite hub by entering a route in the current route table 332 of the router stack 330.

The configuration table 306 may be populated with configuration information for the VSAT. The configuration information may be static or dynamic. For example, the configuration table 306 may include space link addressing information for satellite hubs, identification and authentication information for the satellite hubs, satellite hub load information, local network (local to the VSAT) information, and the like. In some embodiments, the space link addressing information may be populated during initialization of the satellite communication system 300. The local network information can include data entered by a user for defining a network, and routes advertised on the local network by devices connected to the local network. In some embodiments, the routes advertised on the local network may be collected using the router stack 330. The router stack 330 may be a standard routing protocol stack module, such as, a BGP stack module.

Figure 5:
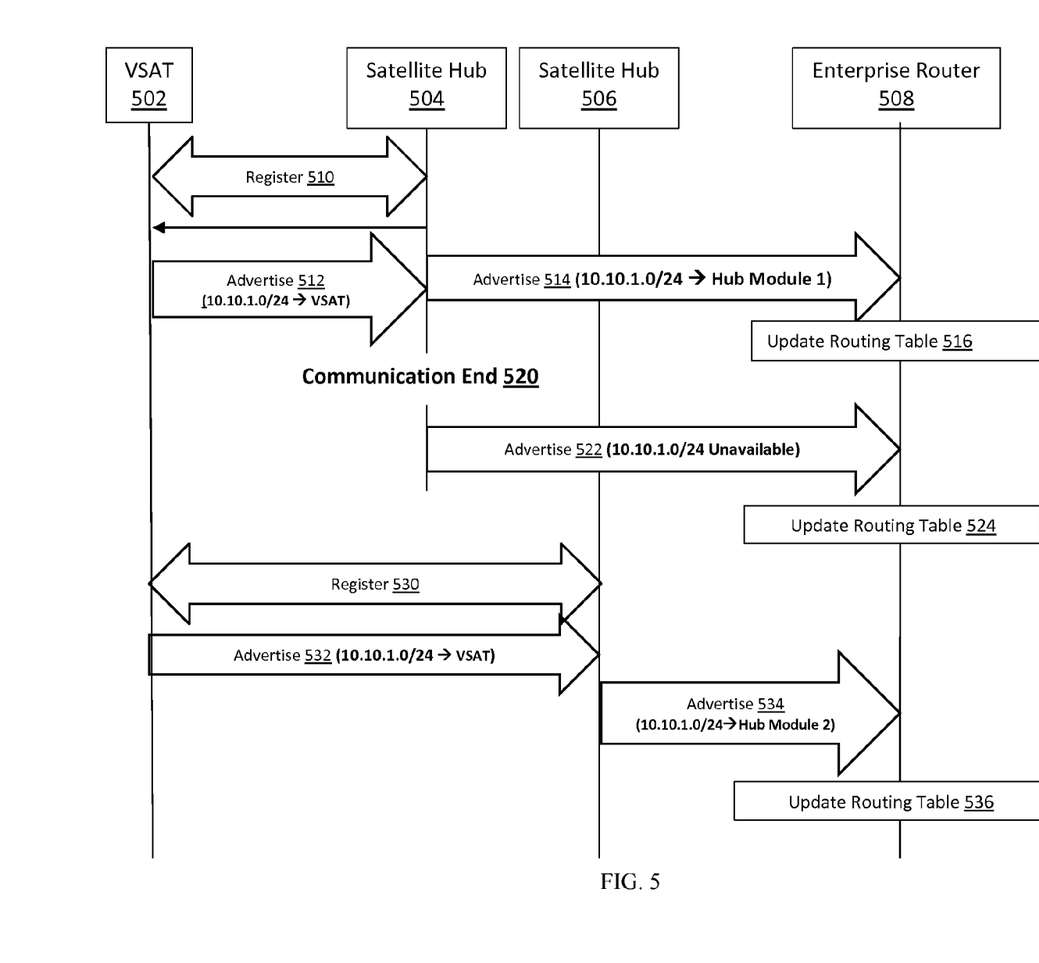
FIG. 5 illustrates an exemplary view of events including a communication failure and switching from a first satellite hub to a second satellite while preserving the remote network addresses after the switch-over, according to various embodiments.

The select hub module 308 may use the information in the configuration table 306 to select a satellite hub and to connect with over the space link interface 324. The select hub module 308 may select a satellite hub based on authorization to use, availability, load, communication integrity, user selection and the like. Once a satellite hub has been selected with the select hub module 308, the registration module 304 may initiate communications with the satellite hub 350 using the space link interface 324 and send a registration request (for example FIG. 5B, register 510) to the selected satellite hub.

When registration with the selected satellite hub is successful, the advertise networks module 334 is executed. The advertise networks module 334 may use the information in the configuration table 306 to advertise networks local to the VSAT 302 and remote from the enterprise network over the space link interface 324 (see for example advertise route 510 of FIG. 5B). The advertising of the local networks may be with a standard network protocol, for example, BGP, when the space link interface 324 supports IP datagram communications.

In some embodiments, the VSAT 302 may monitor or be provided with communication error information, for example, from the space link interface 324. When communications with a satellite hub are lost or a change in the satellite hub being communicated with is desired (for example, due to a configuration change, a user selection or the like), the registration module 304 may be re-executed by the VSAT 302 (see for example event 530 in FIG. 5B), and registration of the VSAT 302 with a selected satellite hub as described above can be provided.

In exemplary embodiments, the registration module 304 may interface with a space link via the space link interface 324. In exemplary embodiments, the registration module 304 may interface with a network interface 322. The VSAT 202 may include a Network Interface Card (NIC) accessible via the network interface 322 and which supports various network transport layers, for example, a wireless network, a Wi-Fi network, a wired network, or the like.

The VSAT 302 may interface with a router stack 330 implemented either internally or externally to the VSAT. The router stack 330 may be selected from one or more standard routing protocol stacks for routing IP datagrams, for example, a Border Gateway Protocol (BGP) stack, or the like. The router stack 330 may maintain a current route table 332 for storing routes to various networks, whether the networks are directly linked on indirectly linked, and the interface to reach the network. For example, the interface to reach the network may be selected from the space link interface 324, the network interface 322, a loopback to itself, or the like. The current route table may be populated by a configuration file, a configuration/operator interface, IP datagrams and the like.

In exemplary embodiments, the satellite hub 350 may be deployed at a headquarters. The satellite hub 350 may include a registration module 352, a router stack 360 and datagram interfaces 370. The registration module 352 may include an authorization module 334. The router stack 360 may include a current route table 362 and an advertise networks module 364. The datagram interfaces 370 may include a network interface 372 and a space link interface 374.

The satellite hub 350 executes the registration module 352 when a registration event (see for example event 310 in FIG. 5B) is received. In some embodiments, prior to registering a VSAT, the satellite hub 350 may execute an authorization module 354. The hub authorization module 354 may determine whether the VSAT 302 requesting registration is authorized to connect to the satellite hub 350. The results of the registration event may be communicated to the VSAT 302.

Upon receiving a successful registration result, the VSAT 302 may communicate an advertise route event (see for example event 312 in FIG. 5B). As such, the satellite hub 350 may advertise the networks connected to the VSAT 302 using the advertise networks module 364. Upon receiving an advertise request from In exemplary embodiments, the registration module 352 may interface with a space link via the space link interface 372. In exemplary embodiments, the registration module 352 may interface with a network interface 372. The network interface 372 may include a Network Interface Card (NIC) supporting, for example, a wireless network, a Wi-Fi network, a wired network, or the like.

Figure 4:
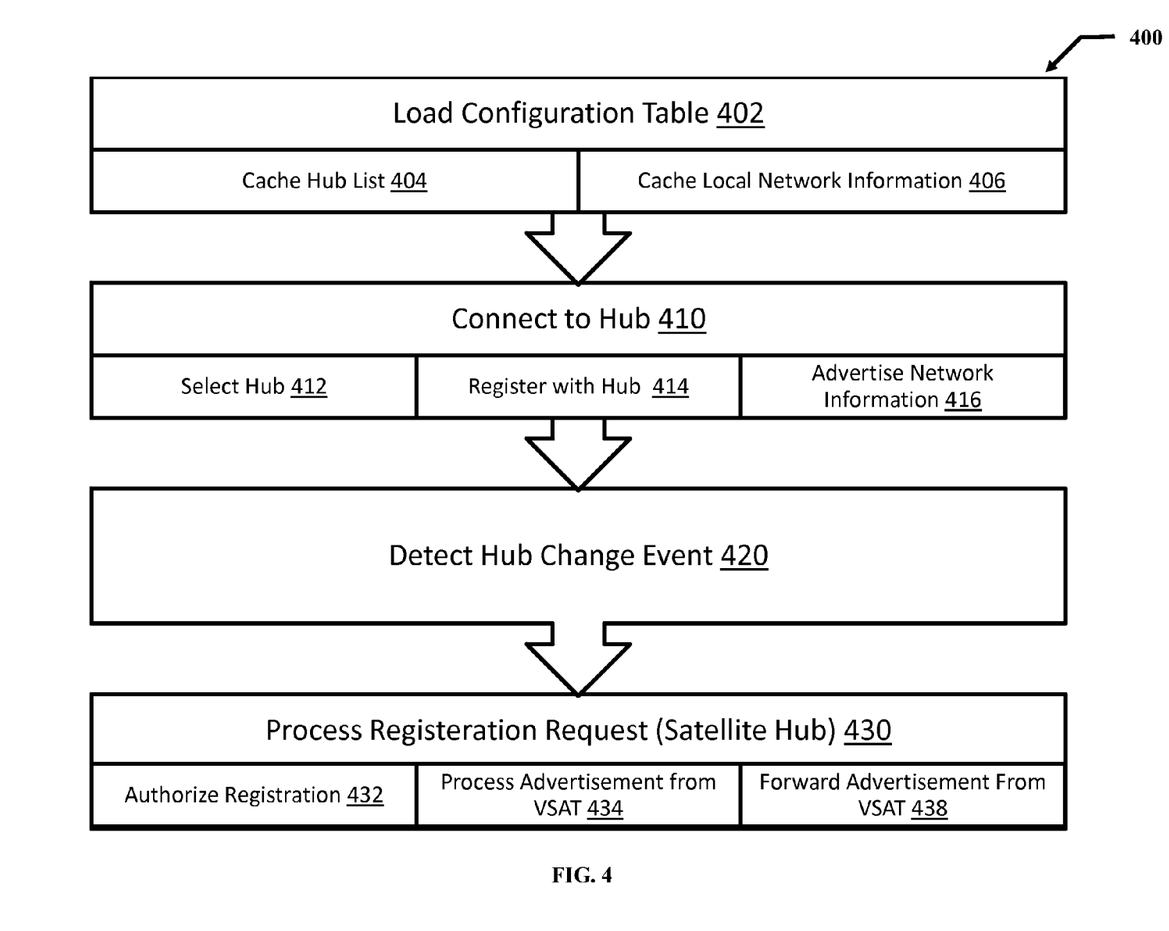
FIG. 4 is a flowchart of an exemplary method that may be implemented in an embodiment of the invention.

FIG. 4 is a flowchart of an exemplary method that may be implemented in an embodiment of the invention.

A method 400 may include operation load configuration table 402. For example, the registration module 304 may be invoked by a VSAT to manage all VSAT registration related activities using, for example, loading the configuration table 306. The configuration information may be static or dynamic. Operation load configuration table 402 may include operation cache hub list 404. For example, the cache hub list may be populated with configuration information for the VSAT. The cache hub list may include space link addressing information for satellite hubs, identification and authentication information for the satellite hubs, satellite hub load information, local network (local to the VSAT) information, and the like. In some embodiments, the cache hub list include space link addressing information may be populated during initialization of the satellite communication system.

Operation load configuration table 402 may include operation cache local network information 406. The local network information can include data entered by a user for defining a network, and routes advertised on the local network by devices connected to the local network. In some embodiments, the routes advertised on the local network may be collected using a router stack. The router stack may be a standard routing protocol stack module, such as, a BGP stack module.

The method 400 may include operation connect to hub 410. In some embodiments, operation connect to hub 410 may initiate or setup communications with a selected satellite hub, for example, via the space link interface 324 of FIG. 3

The operation connect to hub 410 may include operation select hub 412, for example, by using the select hub module 308 of FIG. 3. Operation select hub 412 may use the information provided by operation load configuration table 402 to select a satellite hub and to connect with over the space link interface 324. Operation select hub 412 may select a satellite hub based on authorization to use, availability, load, communication integrity, user selection and the like. Once a satellite hub has been selected, operation connect to hub 402 may initiate communications with the selected satellite hub, for example, by using the space link interface 324 and initiating operation register with hub 414.

The operation connect to hub 410 may include operation register with hub 414, for example, by using the registration module 304 of FIG. 3. Operation register with hub 414 may connect to a satellite hub and provide authentication the necessary authentication and authorization information to the satellite hub to establish communication therewith.

The operation connect to hub 410 may include operation advertise network information 416, for example, by using the advertise networks module 334 of FIG. 3. Operation advertise network information 416 may be used after successfully selecting and establishing communications with a satellite hub. In some embodiments, operation advertise network information 416 may initiate or force advertisement of the route between a VSAT and a satellite hub, for example, by entering a route in a current route table of a router stack. Operation advertise network information 416 may use the information in the configuration table 306 to advertise networks local to a VSAT, but remote from the enterprise router (see for example advertise route 510 of FIG. 5B). The advertising of the local networks may be with a standard network protocol, for example, BGP, when the space link interface 324 supports IP datagram communications.

Operation advertise network information 416 may include interfacing with a router stack, for example, router stack 330, implemented either internally or externally to the VSAT. The router stack may be selected from one or more standard routing protocol stacks for routing IP datagrams, for example, a Border Gateway Protocol (BGP) stack, or the like. The router stack may maintain a current route table for storing routes to various networks, whether the networks are directly linked on indirectly linked, and the interface to reach the network. For example, the interface to reach the network may be selected from the space link interface 324, the network interface 322, a loopback to itself, or the like. The current route table may be populated by a configuration file, a configuration/operator interface, IP datagrams and the like. Data from the current route table may be transmitted to the satellite hub as part of operation advertise network information 416.

In some embodiments, the method 400 may include operation detect hub change event 420. Operation detect hub change event 420 may monitor or be provided with communication error information, for example, from the space link interface 324. When communications with a satellite hub are lost or a change in the satellite hub being communicated with is desired (for example, due to a configuration change, a user selection, satellite hub unavailability, or the like), the registration module 304 may be re-executed by the VSAT 302 (see for example event 530 in FIG. 5B), operation connect to hub 410 with another satellite hub as described above can be provided.

In exemplary embodiments, the method 400 may be deployed in a satellite hub, for example, at a company headquarters as operation process registration request 430. The satellite hub 350 may include an operation authorize registration 432, and an operation process advertisement from VSAT 434.

When a registration request generated pursuant, for example, to operation register with hub 414, is received by a satellite hub (see for example event 310 in FIG. 5B), the method 400 performs operation authorize registration 432. Operation authorize registration 432 may determine whether the VSAT requesting registration is authorized to connect to the satellite hub 350. The results of the registration event may be communicated to the VSAT.

Upon receiving a successful registration result, the VSAT may communicate an advertise route event (see for example event 312 in FIG. 5B). As such, the method 400 performs operation process advertisement from VSAT 434 at the satellite hub. Operation process advertisement from VSAT 434 advertises the networks connected to the VSAT. In some embodiments, operation process advertisement from VSAT 434 updates a current route table on the satellite hub and forwards routes advertised by the VSAT to an enterprise router. As such, an enterprise network is extended to a remote network over a space-link only when the space link communication has been successfully established between the VSAT and the satellite hub, and the satellite hub used for communicating with the remote network can be dynamically selected without altering subnet addresses for the remote network connected to the VSAT.

Exemplary Embodiment

FIG. 5 illustrates an exemplary view of events including a communication failure and switching from a first satellite hub to a second satellite while preserving the remote network addresses after the switch-over, according to various embodiments.

In the following description, a request includes a response. For example, a registration request should be read as a registration request and response. As illustrated by FIG. 5, the present disclose permits moving the VSATs and networks between Satellite Hub Routers, without changing the IP addresses assigned to the VSATs and their networks. Preserving the IP addresses minimizes the impact of satellite hub changes as no network reconfiguration is needed when the satellite hub has to be changed due to load balancing or satellite hub failure.

A VSAT 502 selects or picks a satellite hub router 504 to establish a space link with and begins communicating with a registration request 510. The VSAT 502 then advertises the VSATs' subnets/prefixes to the selected satellite hub 504 (here, 10.10.1.0/24 via VSAT 502) by sending an advertise request 512. The satellite hub 504 processes the advertise request 512 and generates an advertise request 514 to an enterprise router 508. The advertise request 514 advertises to the enterprise router 508 that the subnets/prefixes of VSAT 502 are reachable via the satellite hub 504. In some embodiments, the enterprise router 508 updates its routing table with the new route at 516.

Sometime later, a communication end 520 between the VSAT 502 and satellite 504. The communication end 520 may be orderly and planned, or maybe caused due to malfunction. In some embodiments, when satellite hub 504 is functioning but communications to the VSAT 502 have failed, the satellite hub 504 may send an advertise request 522 to the enterprise server 508 marking the subnets/prefixes of VSAT 502 being unavailable. In some embodiments, the enterprise router 508 updates its routing table with the unavailability of the route at 524. In some embodiments, when the satellite hub 504 has malfunctions and caused the communication end 520, the enterprise server 508 will be unable to communicate to the hub 504 or VSAT 502 via hub 504, and update its routing table accordingly (not shown).

Sometime later, the VSAT 502 may pick or select satellite hub 506 to establish a space link with and begins communicating with a registration request 530. The VSAT 502 then advertises the VSATs' subnets/prefixes to the selected satellite hub 506 (here, 10.10.1.0/24 via VSAT 502) by sending an advertise request 532. The satellite hub 506 processes the advertise request 532 and generates an advertise request 534 to an enterprise router 508. The advertise request 514 advertises to the enterprise router 508 that the subnets/prefixes of VSAT 502 are reachable via the satellite hub 506. In some embodiments, the enterprise router 508 updates its routing table with the new route at 536.

Figure 6A:
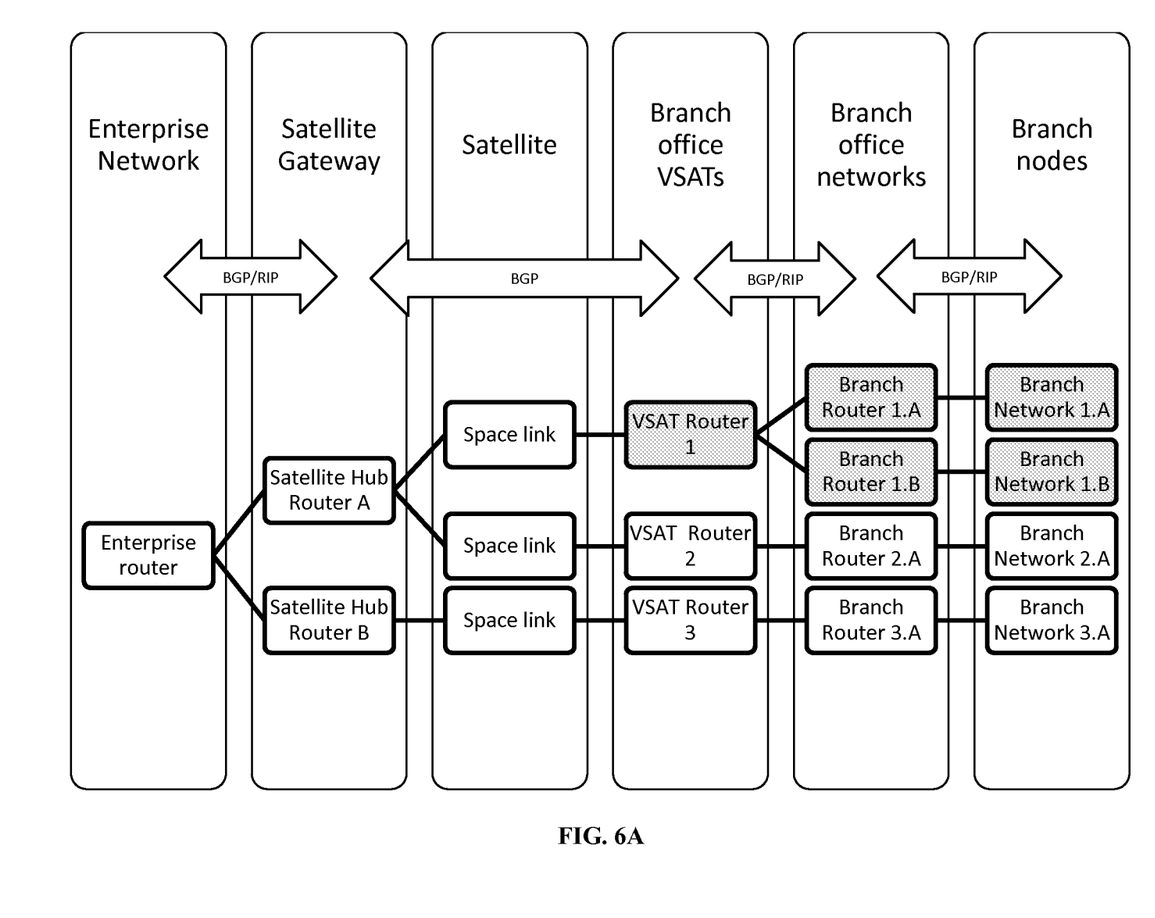
FIG. 6A illustrates a logical view of an enterprise network including a VSAT using a first space link to communicate via a first satellite hub, according to various embodiments.

FIG. 6A illustrates a logical view of an enterprise network including a VSAT using a first space link to communicate via a first satellite hub, according to various embodiments.

Figure 6B:
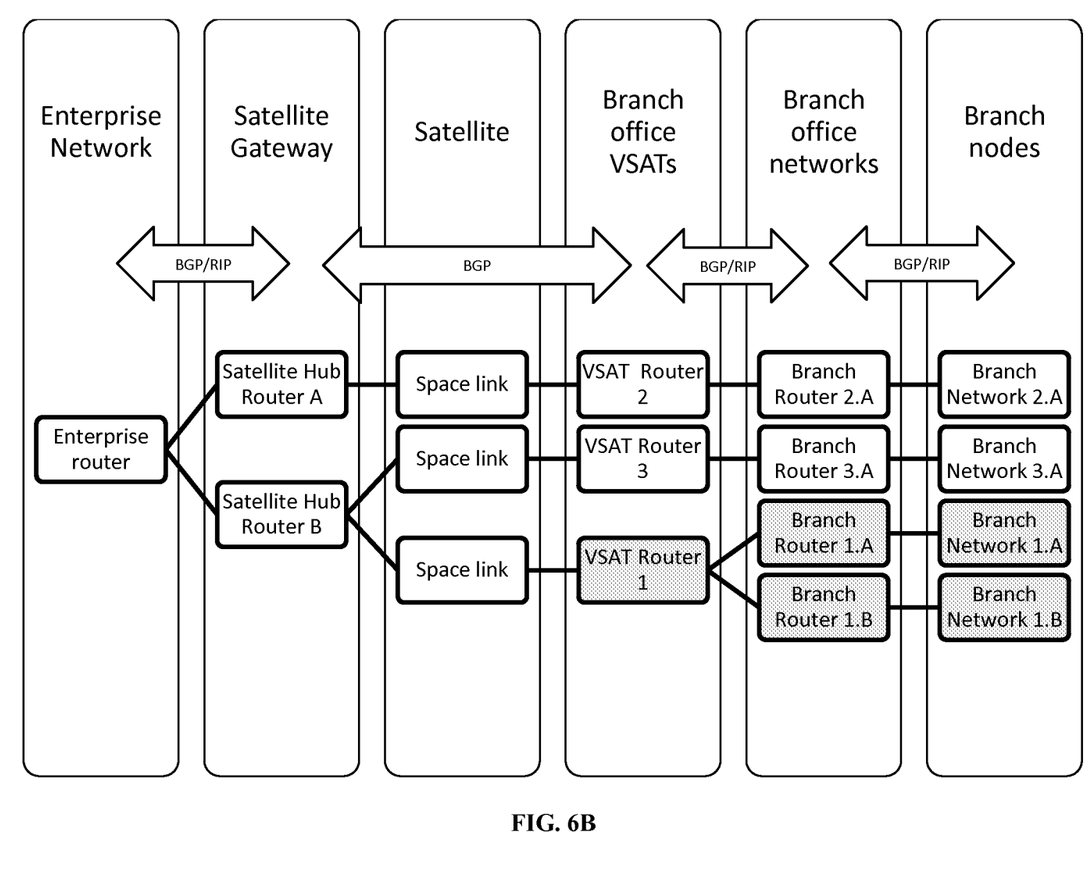
FIG. 6B illustrates a logical view of the enterprise network of FIG. 6A including the VSAT using a second space link to communicate via a second satellite hub, according to various embodiments.

FIG. 6B illustrates a logical view of the enterprise network of FIG. 6A including the VSAT using a second space link to communicate via a second satellite hub, according to various embodiments.

The network of FIG. 6A includes three VSATs. The enterprise router learns about routes to the three VSATs via the satellite hub routers. The routing table at the enterprise router may be as follows:

| Enterprise Router | |
|---|---|
| Network | Next Hop |
| Branch Network 1.A | Satellite Hub Router A |
| Branch Network 1.B | Satellite Hub Router A |
| Branch Network 2.A | Satellite Hub Router A |
| Branch Network 3.A | Satellite Hub Router B |

A satellite hub change is illustrated with an example. VSAT 1 from Satellite Hub Router "A" (FIG. 6A) switches to Satellite Hub Router "B" (FIG. 6B) as it finds that Satellite Hub Router "B" is lightly loaded. The VSAT Router 1 will now establish a BGP peering relationship with Satellite Hub Router "B" and advertise the routes. This results in advertisement of VSAT 1 routes to the Head Office Router. In some embodiments, the other networks in the Enterprise may see a momentary disruption due to the change of the Satellite Hub Router. Once VSAT 1 completes the registration with Satellite Hub Router B, the VSAT 2 networks will be reachable without any change in IP addressing. The updated routing table on Head Office Router follows.

| Enterprise Router | |
|---|---|
| Network | Next Hop |
| Branch Network 1.A | Satellite Hub Router B |
| Branch Network 1.B | Satellite Hub Router B |
| Branch Network 2.A | Satellite Hub Router A |
| Branch Network 3.A | Satellite Hub Router B |

As illustrated in FIG. 6A and FIG. 6B, an enterprise network may include multiple satellite hubs that may connect to multiple VSAT routers via multiple space links. In some embodiments, a VSAT router may connect to multiple branch routers to support to multiple remote networks.

Advantages of the present disclosure are many. For example, satellite hub routers do not need to be 1:1 redundant active-standby. The satellite hub routers may be operated as a pool of satellite hub routers operating on a load sharing basis. Load sharing has several advantages. For example, even when two Satellite Hub Routers are present, the load on each router may be half of the load in a 1:1 redundant configuration. Moreover, the load per hub is reduced as more hubs are added. As such, the impact of a failure is also reduced. In a system with two hubs, failure of a hub effects only half the population of VSATs. Similarly, in a three hub system, only one-third of the users will be impacted upon the failure of a hub.

Additional capacity can be added by just adding a single satellite hub router. In a 1:1 redundant scheme, the enterprise or satellite communication provider has to add a minimum of two satellite hub routers to increase the capacity.

In a 1:1 redundant system, the capacity on a subnet shared between VSATs is limited to a single satellite hub router. Load sharing mode has no such limit. The enterprise or satellite communication provider can increase capacity by adding more hubs.

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they should not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents should only define the invention, rather than any specific examples given.

We claim as our invention:

1. An apparatus to preserve Internet Protocol (IP) addressing over a space link, the apparatus comprising:
a network interface;
a space link interface;
a configuration table, disposed in a Very Small Aperture Terminal (VSAT), comprising Very Small Aperture Terminal (VSAT) network information and a satellite hub table, wherein the VSAT network information comprises subnet and range information for a network linked to the network interface; and
a VSAT registration module configured to:
select a satellite hub from the satellite hub table for communicating with using the space link interface,
register the apparatus with the selected hub, and
advertise the local-network information by communicating a route based on the local-network information to the selected hub,
wherein the local-network information is independent of the hub selected from the satellite hub table.

2. The apparatus of claim 1, further comprising a router stack to communicate an IP datagram over the space link interface, wherein the IP datagram comprises the route based on the local-network information.

3. The apparatus of claim 1, wherein the local-network information is based on a routing packet received over the network interface.

4. The apparatus of claim 1, wherein the local network information comprises an IP address for the apparatus.

5. The apparatus of claim 1, wherein the apparatus is configured to operate as a Very Small Aperture Terminal (VSAT).

6. The apparatus of claim 1, wherein the VSAT registration module is configured to select the satellite hub based on one or more of space link availability, load on the hub, a communication latency, cost of the space link, or a combination thereof.

7. The apparatus of claim 1, wherein the VSAT registration module is configured to advertise using a standard internet routing protocol compliant with the Border Gateway Protocol (BGP).

8. The apparatus of claim 1, wherein the VSAT registration module is configured to register with a second hub selected from the satellite hub table, wherein the second hub is different than the selected hub.

9. The apparatus of claim 1, wherein the satellite hub table comprises space link addressing information for a plurality of satellite hubs.

10. A system to preserve Internet Protocol (IP) addressing over a space link, the system comprising:
a Very Small Aperture Terminal (VSAT) comprising:
a network interface,
a space link interface, and
a configuration table comprising Very Small Aperture Terminal (VSAT) network information and a satellite hub table, wherein the VSAT network information comprises subnet and range information for a network linked to the network interface, and a VSAT registration module configured to select a satellite hub from the satellite hub table for communicating with using the space link interface, register the apparatus with the selected hub, and advertise the local-network information by communicating a route based on the local-network information to the selected hub; and a satellite hub comprising:

a registration module configured to register the VSAT, and an advertise networks module to advertise the local network information from the VSAT, wherein the local-network information is independent of the hub selected from the satellite hub table.

11. The system of claim 10, wherein the local-network information is based on a routing packet received over the network interface.

12. The system of claim 10, wherein the local network information comprises an IP address for the apparatus.

13. The system of claim 10, wherein the VSAT registration module is configured to select the satellite hub based on one or more of space link availability, load on the hub, a communication latency, cost of the space link, or a combination thereof.

14. The system of claim 10, wherein the VSAT registration module is configured to advertise using a standard internet routing protocol compliant with the Border Gateway Protocol (BGP).

15. The system of claim 10, wherein the VSAT registration module is configured to register with a second hub selected from the satellite hub table, wherein the second hub is different than the selected hub.

16. The system of claim 10, wherein the VSAT further comprises a router stack to communicate an IP datagram over the space link interface, wherein the IP datagram comprises the route based on the local-network information.

17. The system of claim 10, wherein the satellite hub table comprises space link addressing information for a plurality of satellite hubs.

* * * * *